United States Patent
Lower

(10) Patent No.: US 6,341,411 B1
(45) Date of Patent: Jan. 29, 2002

(54) WHEEL LIFTING ROD ASSEMBLY

(76) Inventor: William Ross Lower, 5535 Bluff St., Norco, CA (US) 92860-2421

(*) Notice: Subject to any disclaimer, the term of this patent is extended or adjusted under 35 U.S.C. 154(b) by 0 days.

(21) Appl. No.: 09/699,208

(22) Filed: Oct. 27, 2000

Related U.S. Application Data

(63) Continuation-in-part of application No. 09/505,348, filed on Feb. 16, 2000.

(51) Int. Cl.[7] ............................................. B25B 27/14
(52) U.S. Cl. ............................................. 29/273; 29/84
(58) Field of Search ............................. 254/131, 120, 254/133 R; 29/273, 270, 267, 84

(56) References Cited

U.S. PATENT DOCUMENTS

| | | | |
|---|---|---|---|
| 1,494,269 A | | 5/1924 | Meyers |
| 1,975,773 A | * | 10/1934 | Davis ............................. 29/84 |
| 2,340,986 A | * | 2/1944 | Roberts ........................... 29/84 |
| 2,555,698 A | * | 6/1951 | Masheck ........................ 29/273 |
| 2,770,873 A | * | 2/1956 | Ramsey ......................... 29/273 |
| 3,389,453 A | * | 6/1968 | Tarter et al. |
| 4,097,979 A | | 7/1978 | Interdonato |
| 4,602,415 A | | 7/1986 | Garcia |
| 4,949,488 A | | 8/1990 | Holk |
| 5,022,133 A | | 6/1991 | Weitekamp |
| 5,180,141 A | * | 1/1993 | Hunt ............................ 254/131 |
| D343,997 S | | 2/1994 | Smith |
| D347,981 S | | 6/1994 | Suggs, Sr. |
| 5,479,692 A | | 1/1996 | Barkus |
| 5,568,956 A | * | 10/1996 | Benefield ....................... 294/15 |
| 5,581,866 A | | 12/1996 | Barkus |
| 5,716,105 A | * | 2/1998 | Seifert ...................... 301/35.62 |
| 5,897,171 A | | 4/1999 | Seifert |
| D412,271 S | | 7/1999 | Kliskey |

FOREIGN PATENT DOCUMENTS

WO   WO95/11779   5/1995

* cited by examiner

Primary Examiner—Joseph J. Hail, III
Assistant Examiner—Daniel Shanley
(74) Attorney, Agent, or Firm—Gene Scott-Patent Law & Venture Group

(57) ABSTRACT

An apparatus comprises a pair of smooth linear rods joined at one end by a coil spring or elastic cord so as to be mutually supportive at the joined end. The free end of the rods is prepared for engaging a tire mounting stud or mounting bolt hole. With the rods engaged through adjacent mounting holes in the spare tire and with the free ends of the rods engaged with the wheel hub, the rods may be used to lever the tire off the ground and then to slide it into place against the wheel hub where it may easily be fixed prior to removal of the apparatus.

9 Claims, 3 Drawing Sheets

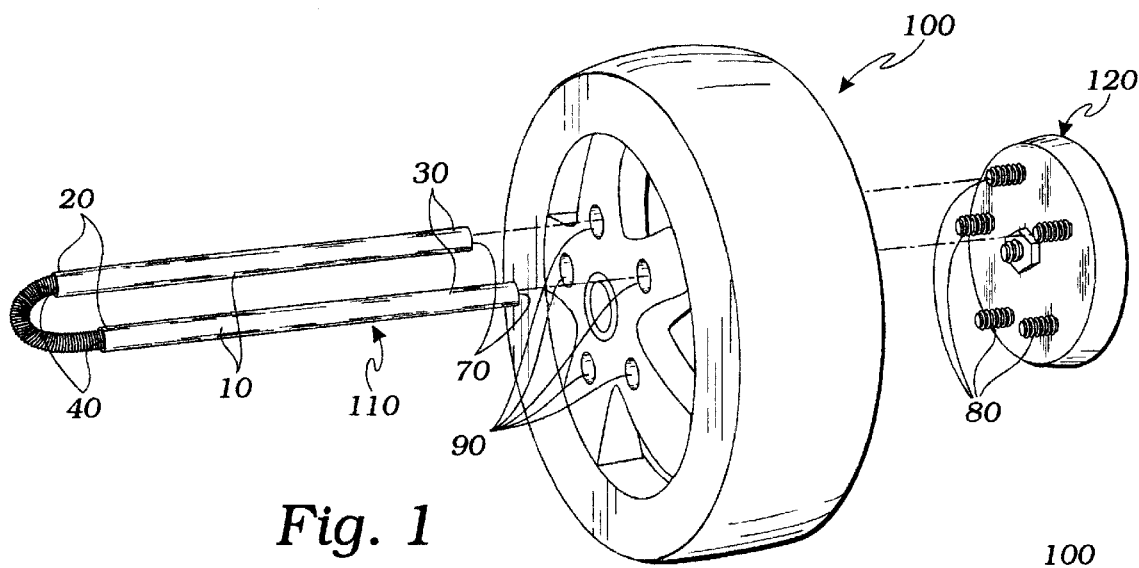
Fig. 1
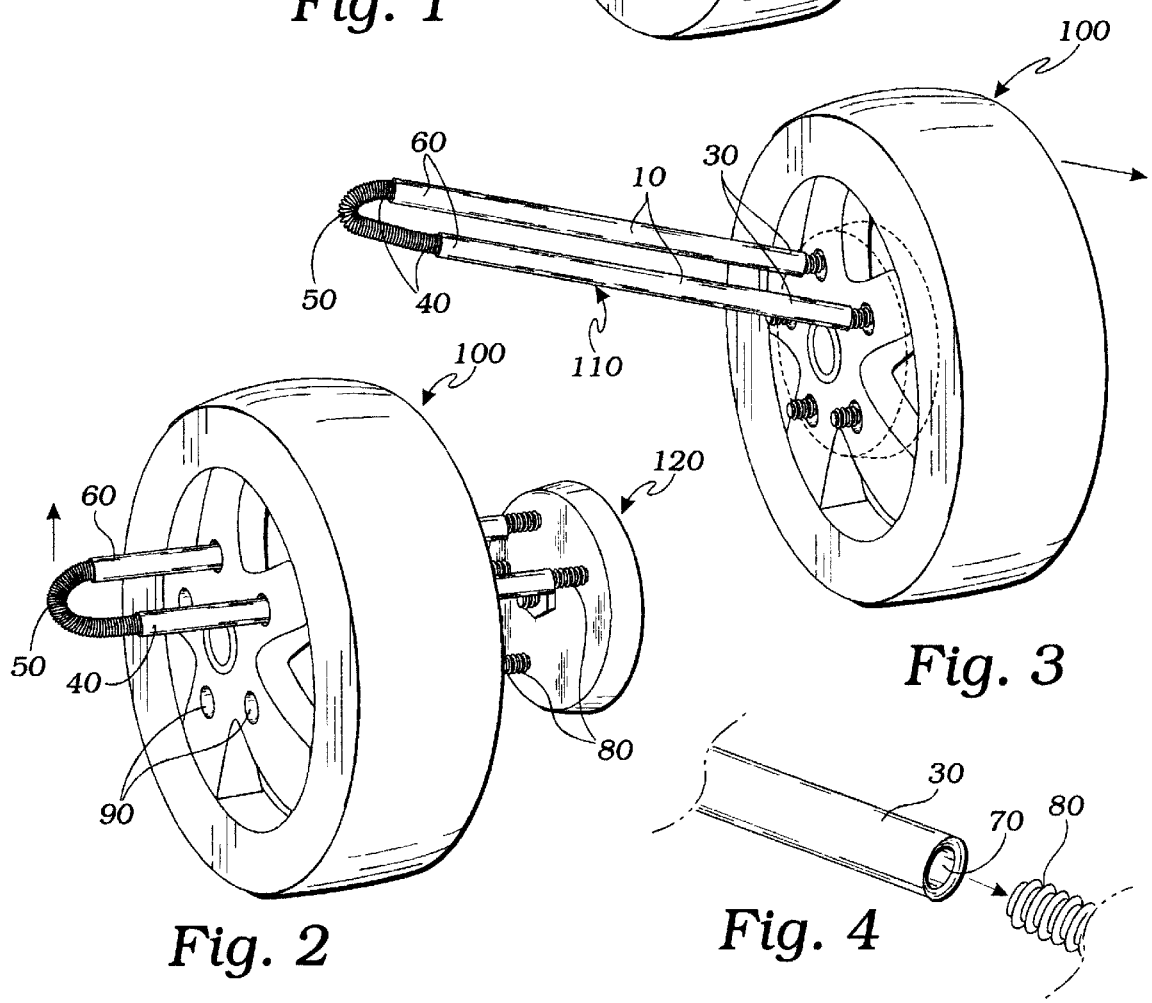
Fig. 2
Fig. 3
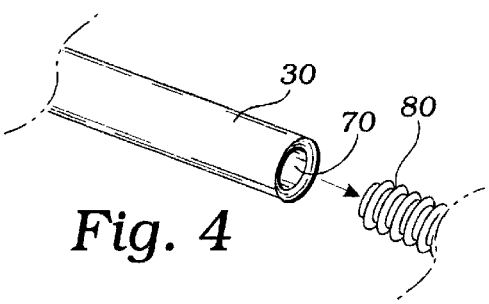
Fig. 4

WHEEL LIFTING ROD ASSEMBLY

This application is a continuation in part, and therefore claims the priority of a previously filed utility patent application, Ser. No. 09/505,348 having an official filing date of 2/16/2000 and contains matter identical and similar thereto.

BACKGROUND OF THE INVENTION

1. Field of the Invention

This invention relates generally to devices for lifting a replacement wheel assembly onto an automobile mounting plate or hub, and more particularly to a dual-rod device integral with a spring allowing for both lifting and alignment of a wheel assembly onto a wheel hub.

2. Description of Related Art

The following art defines the present state of this field: Barkus et al. U.S. Pat. No. 5,479,692 describes devices and methods are provided for use in lifting an automobile wheel into an automobile body. An elongated member releaseably engages an automobile wheel and pivots on the body of the automobile as the elongated member is lifted to lift the automobile wheel into the body. In addition, devices and methods are provided for mounting an automobile wheel on an automobile wheel hub assembly and removing the same therefrom. An elongated member is placed within a central aperture of an automobile wheel and the elongated member is pivoted either on an outer surface of an axially central member of an automobile wheel hub assembly or on an inner wall of an axially central member thereof.

Barkus et al. U.S. Pat. No. 5,581,866 provides devices for use in lifting an automobile wheel into an automobile body. An elongated member releaseably engages an automobile wheel and pivots on the body of the automobile as the elongated member is lifted to lift the automobile wheel into the body. In addition, devices and methods are provided for mounting an automobile wheel on an automobile wheel hub assembly and removing the same therefrom. An elongated member is placed within a central aperture of an automobile wheel and the elongated member is pivoted either on an outer surface of an axially central member of an automobile wheel hub assembly or on an inner wall of an axially central member thereof.

Smith et. al. U.S. Pat. No. D343,997 shows the ornamental design for a tool for mounting a wheel on a vehicle, as shown and described.

Garcia et al. U.S. Pat. No. 4,602,415 describes a wheel mounting device, comprising a handle mounted centered and normal to one surface of a crossbar, cylindric arms extending, respectively from the opposite surface of the crossbar, terminating in undercut heads having, respectively diameters larger than those of the arms, and a roller frame detachably mounted to the crossbar for manipulating the position of the wheel relative to a hub.

Seifert et al. U.S. Pat. No. 5,897,171 describes an apparatus and methods for facilitating replacement of a vehicle wheel and eliminating the frustrations associated with the alignment of lug bolts with holes in the replacement wheel. The invention may be included in new vehicles or retrofitted by the owners of older vehicles. The apparatus comprises an elongated support member extending from a hub of a vehicle adjacent to lug bolts also extending from the hub or hub holes in the hub. The hub is rotated so that the support member is in the topmost position, and the replacement wheel is hung on the support member. Gravity insures that the holes in the wheel are aligned with the lug bolts so that it is easy to push laterally on the wheel to engage the lug bolts in the holes. The support member may include one lug bolt which is longer than the others or a dedicated guide pin attached to the hub. In another embodiment, one of the holes is enlarged, and a topmost lug bolt is elongated by slipping a guide tube over it after inserting the tube through the enlarged wheel hole. The tube can be included in a kit along with a machining tool for enlarging the hole. To further ease the task, the tube may be beveled at the end which slips onto the lug bolt and then used as a lever to lift the tire into place. The beveled end allows for easy positioning of the guide tube even when the guide tube is disposed at an angle to the lug bolt. The invention is readily adaptable to various vehicles.

Interdonato et al. U.S. Pat. No. 4,097,979 describes a guide tool to assist in mounting and dismounting an automobile wheel on the hub mounting studs therefor includes an elongated hollow tubular body internally threaded at the ends thereof with different diameter threads for threaded engagement with either of two different size wheel studs. The outer surface of the body is cylindrical and dimensioned to be received through the stud holes of the wheel for guiding the wheel onto and off of the studs without sliding engagement between the wheel and the stud threads. Diametrically opposed recesses in the outer surface of the body intermediate the ends thereof provide a seat for an end wrench or the like to facilitate mounting the guide tool on or removing it from a wheel stud.

Suggs, Sr. et. al. U.S. Pat. No. D347,981 shows the ornamental design for a tire lifting and handling tool, as shown.

Hebnes et al. U.S. Pat. No. 4,949,448 describes a wheel mounting tool for mounting a wheel having a plurality of mounting holes to a hub having a plurality of corresponding externally threaded mounting studs. The tool includes a socket portion with an internal thread for engaging a threaded stud of the hub, and an offset elongated handle portion pivotally attached to the socket portion. In use the tool can be threaded to a mounting stud of the hub, placed through a mounting hole of the wheel, and pivoted about the stud to lift and force the wheel onto the hub with all of the mounting holes of the wheel in alignment with all of the mounting studs of the hub.

Weitekamp et al. U.S. Pat. No. 5,022,133 describes a wheel mounting tool for a wheel assembly including a hub with a plurality of bolt studs and a wheel with bolt holes registerable with the bolt studs comprises an elongated, rigid straight shank with a cylindrical open-ended socket on at least one end. The socket has an inside cylindrical surface with a diameter larger than the diameter of the bolt studs and an outside cylindrical surface with a diameter smaller than the diameter of the bolt holes. In a preferred embodiment, a shallow internal thread extends circumferentially around the inside cylindrical surface adjacent the open mouth end of the socket. The inside diameter of the internal threads is larger than the outside diameter of the bolt studs enabling the socket to be assembled onto and removed from the bolt studs by relative axial movement. Alternatively, the internal threads may be substituted by a helical array of thread segments or internal protuberances having a pitch angle matching the pitch angle of the threads on the bolt studs. A further alternative is to provide an inner sleeve of indentable material inside the socket to resist relative axial movement between the socket and bolt stud during mounting of the wheel.

Kliskey et. al. U.S. Pat. No. D412,271 shows the ornamental design for a tire mount/demount bar, as shown and described.

Tarter et. al. U.S. Pat. No. 3,389,453 describes a rod-like tool having a threaded end for engagement with the threads in a brake drum or studs provided for securing an automobile wheel in place. A flexible joint is spaced a short distance from the end. The diameter of the tool is sufficiently small to pass through a bolt hole in the wheel. When an automobile wheel is to be installed, the threaded end is engaged with the drum and the rod passed through one of the holes in the wheel disk, the flexible joint bending downward when the wheel is on the ground. By lifting up on the outer end of the tool, the wheel slides into place with little manual effort. A slidable handle is used to hold the wheel in position while the lug studs or nuts are being installed.

Meyers, et. al. U.S. Pat. No. 1,494,269 describes a tool comprising a substantially elongated handle member, a bolt engaging member at one end of said handle, and means for setting up a loose connection between said handle and bolt engaging member.

Barkus et. al. WO 95/11779 describes devices for use in lifting an automobile wheel into an automobile body. An elongated member releaseably engages an automobile wheel and pivots on the body of the automobile as the elongated member is lifted to lift the automobile wheel into the body. In addition, devices are provided for mounting an automobile wheel on an automobile wheel hub assembly and removing the same therefrom. An elongated member is placed within a central aperture of an automobile wheel and the elongated member is pivoted either on an outer surface of an axially central member of an automobile wheel hub assembly or on an inner wall of an axially central member thereof.

The prior art teaches tire mounting devices of various types including dual parallel connected handle rods designed to lift a wheel assembly onto lug studs as in the present invention. However, the prior art does not teach two rods joined together by a flexible member that enables the wheel assembly to be horizontally aligned on the lug studs or lug holes at the same time it is mounted, and that also can be used on wheel assemblies of various sizes and lug stud configurations. The present invention fulfills these needs and provides further related advantages as described in the following summary.

SUMMARY OF THE INVENTION

The present invention teaches certain benefits in construction and use which give rise to the objectives described below.

The present invention provides an apparatus comprising a pair of smooth linear rods joined at one end to each other by a flexible spring or elastic cord so as to be permanently joined and yet each rod is free to manipulate as necessary in use for mounting a spare tire onto the wheel hub of a vehicle.

A primary objective of the present invention is to provide a wheel assembly mounting, lifting, and aligning apparatus having advantages not taught by the prior art.

Another objective is to provide an apparatus comprising a single assembly to prevent one part from becoming displaced from the other.

A further objective is to provide an apparatus which allows the wheel assembly to be aligned on two lug studs or adjacent to two lug holes at the same time, therefore obviating the need for manual rotation of the wheel assembly.

A further objective is to provide an apparatus with a flexible rod spacing so that the apparatus can be used with various wheel assembly sizes and lug stud configurations.

A further objective is to provide an apparatus with rods having such a low coefficient of friction that an automotive wheel slides easily along the rods when the rods are appropriately angled toward the wheel assembly.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1 is a perspective view of a preferred embodiment of the present invention shown in position ready for lifting a wheel onto a wheel hub;

FIG. 2 is similar to FIG. 1 but showing the invention inserted in stud holes in a wheel and engaging mounting studs of the wheel hub;

FIG. 3 is similar to FIG. 2 but showing the wheel slid into place onto the mounting studs of the wheel hub;

FIG. 4 is a perspective view of an end of a rod of the invention as it is being engaged onto a mounting stud of a wheel hub;

DETAILED DESCRIPTION OF THE INVENTION

Figure 6:
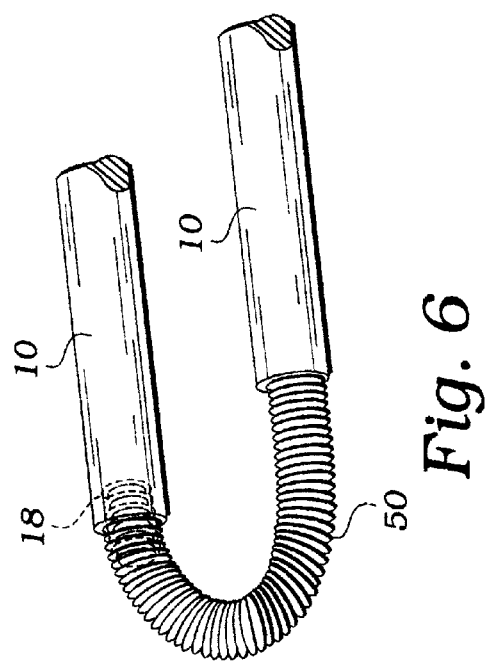
FIG. 6 is a partial view of the rods of the invention showing the completed assembly of the parts shown in FIG. 5.
Figure 5:
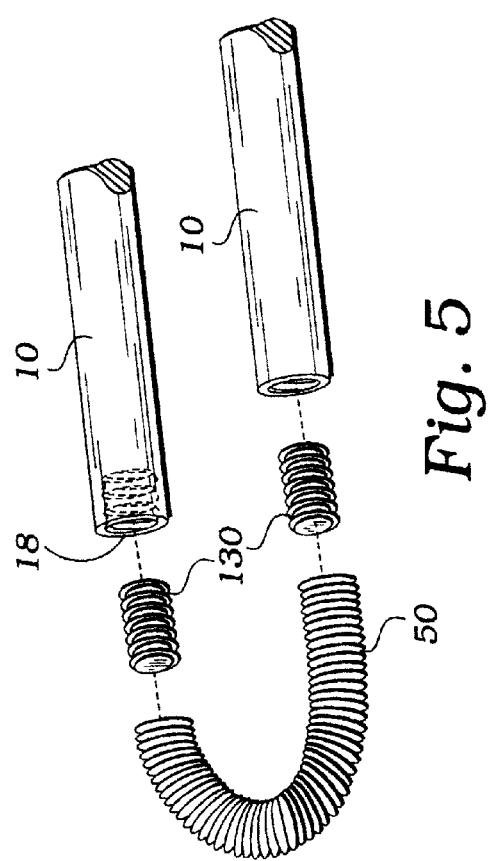
FIG. 5 is an exploded partial view of the rods of the invention showing a first method of attachment to a coil spring.
Figure 8:
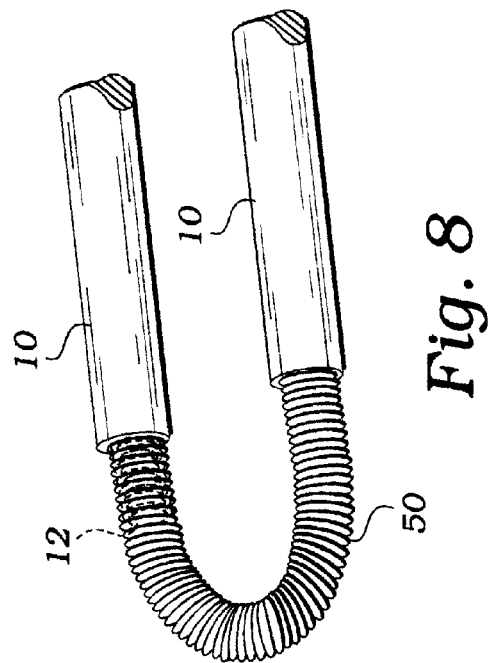
FIG. 8 is a partial view of the rods of the invention showing the completed assembly of the parts shown in FIG. 7.
Figure 7:
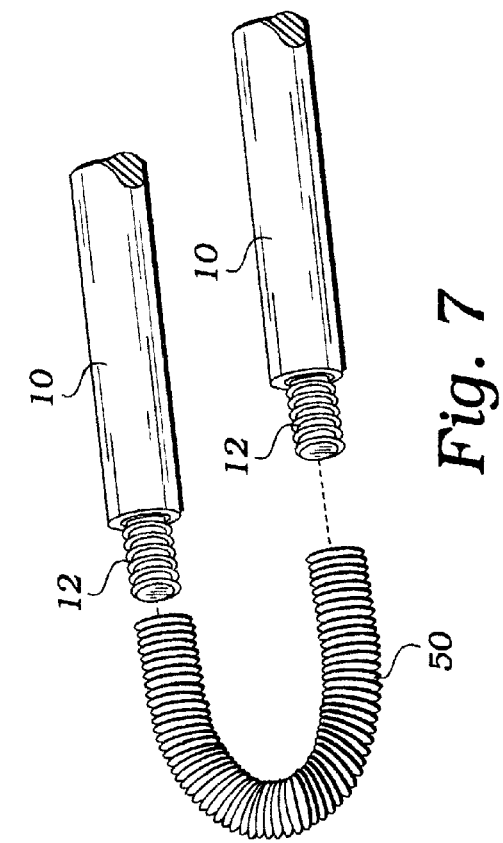
FIG. 7 is an exploded partial view of the rods of the invention showing a second method of attachment to a coil spring.

The above described drawing figures illustrate the invention, a wheel lifting rod assembly 110 comprising a pair of smooth linear rods 10, preferably constructed of a metal such as aluminum or steel with a hard coating such as anodizing or plating respectively, each of the rods providing a first rod end 30 and a second rod end 60. The first end 30 thereof provides an engagement means 70 or 75 for engaging a wheel hub 120; an elongate flexible member 50 or 55 providing terminal opposing ends thereof 40 or 45 respectively, each one of the opposing ends of the flexible member joined to the second end 60 of one of the elongate rods 10; wherein the flexible member 50 or 55 is of such a length as to permit the elongate rods 10 to be positioned in parallel spaced apart positions for being engaged with spaced apart wheel mounting elements 80 of the wheel hub 120 after being inserted through holes 90 in a wheel 100 to be mounted.

Figure 11:
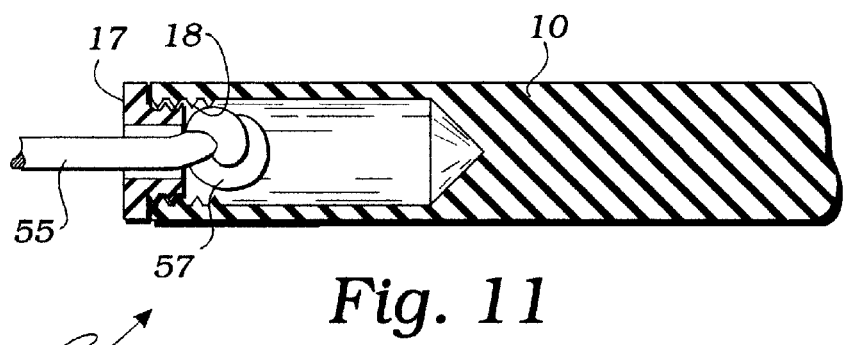
FIG. 11 is a partial vie w of a rod of the invention showing a first method of attachment to an elastic band.
Figure 12:
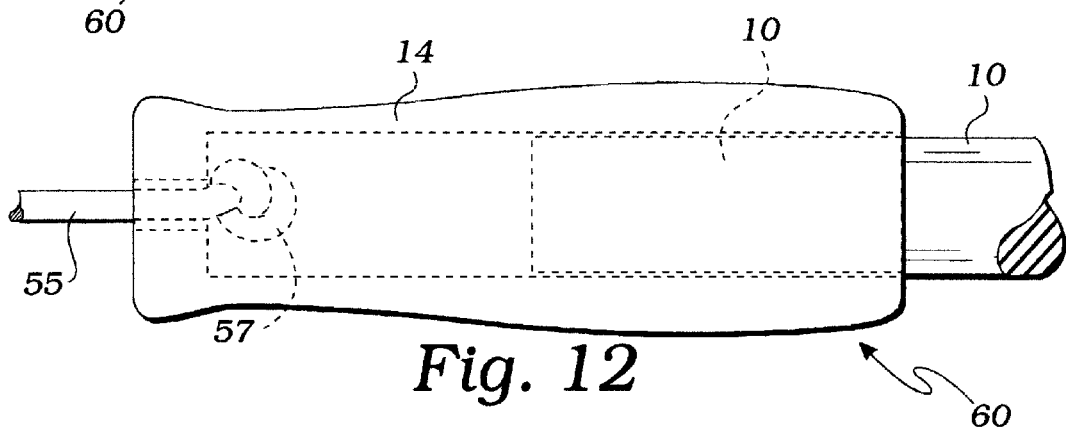
FIG. 12 is a partial view of a rod of the invention showing a second method of attachment to an elastic band by using a handle.

The flexible member may be a coil spring 50 as shown in FIGS. 5–8, or an elastic cord 55 as shown in FIGS. 11 and 12. The second ends 60 of the elongate rods 10 may provide a threaded hole 18 (FIG. 5) for threadably receiving one of the ends 40 of the coil spring 50 directly or a threaded stud 130 may be threadably engaged therein, a portion of the threaded stud 130 extending outwardly from the threaded hole 18 with the coil spring 50 threadably engaged thereon as is shown in FIG. 6. Alternately, the second ends of the elongate rods may be formed integrally as an integral threaded stud 12 extending outwardly with the integral threaded stud 12 receiving the ends 40 of the coil spring 50 threadably thereon.

In another embodiment each of the second ends 60 of the elongate rods 10 provides a threaded hole 18 receiving one of an opposing ends of the elastic cord 55, and a pair of threaded caps 17 is engaged with the threaded holes 18 for securing the ends of the elastic cord 55 therein. This can be easily accomplished by knotting the elastic cord 55 with a knot 57 as shown in FIG. 11.

In yet another embodiment, each of the second ends 60 of the elongate rods 10 provides a handle 14, as shown in FIG. 12, wherein the handles 14 are adapted for engaging one of the ends of the elastic cord 55, again by a knot 57 or other common attachment method.

Preferably, the linear rods 10 each have a hard smooth surface of such coefficient of friction as to enable the automobile wheel to slide along the linear rods 10, by manual pressure when the linear rods 10 are held approximately horizontally.

Figure 9:
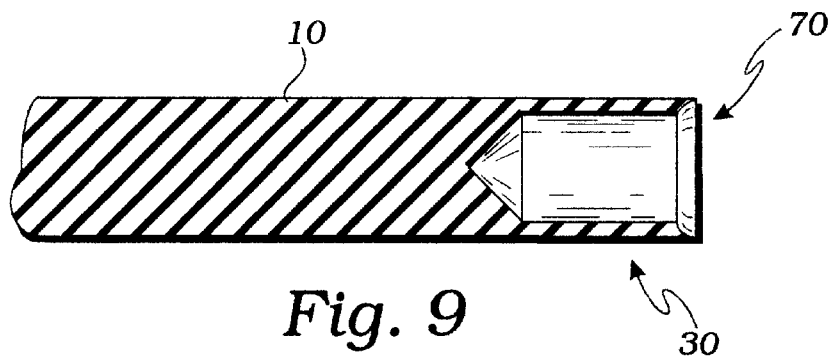
FIG. 9 is a sectional view of a rod of the invention showing a first structure for attachment to a lug stud.
Figure 10:
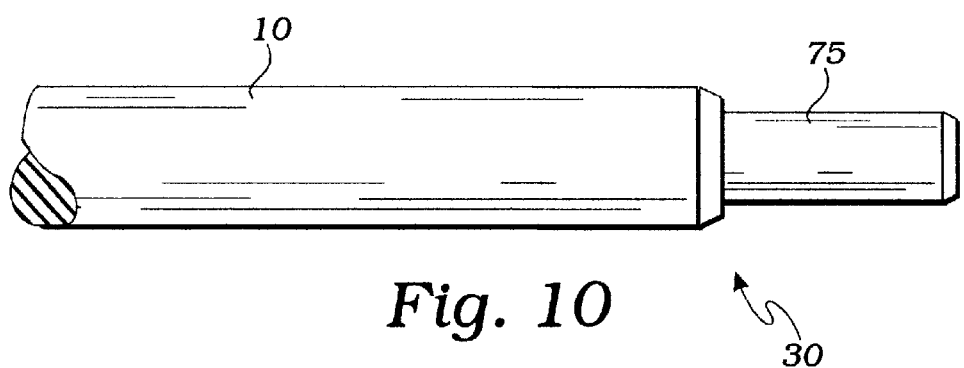
FIG. 10 is a partial side view of a rod of the invention showing a second structure for engagement with a threaded lug bolt hole.

In use, with the wheel 100 resting on a ground surface, it is generally possible by using the instant invention, to position the wheel at a height such that lug studs 80 are aligned with two lug holes 90 in the wheel 100. This is easily accomplished by placing the rods 10 of the present invention into two adjacent holes 90 in the wheel 100, as shown in FIG. 2, and then engaging the first end 30 of each of the rods 10 with wheel mounting elements 80 (lug studs or holes) as shown also in FIG. 2. The rods are then lifted slightly so as to raise the wheel 100 off the ground whereupon it is pushed into place against the wheel hub 120 and then fastened into place. The first end of rods 10 may be constructed as shown in FIG. 9 when the wheel hub 120 provides studs extending outwardly therefrom as shown in FIGS. 1–4. On some cars, studs are not used, but rather threaded holes, so that loose bolts (not shown) are used in place of the fixed studs 80. In this case, the first end of rods 10 are constructed as shown in FIG. 10 wherein smooth stud 75 is inserted into the threaded holes in wheel hub 120. In this case, with the wheel 100 in place adjacent to wheel hub 120, it is then possible to fasten the wheel 100 to hub 120 with the loose bolts prior to removing the invention so that the remaining bolts may be applied. When fixed threaded studs 80 are present, lug nuts are used to hold the wheel 100 in place prior to removing the invention. When the wheel 100 is resting against the wheel hub 120, the rods 10 may be pulled away from the wheel 100, leaving the wheel in a proper position.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus comprising:
    a pair of elongate rods, each of the rods terminating, at a first end thereof, with a wheel hub engagement means, the wheel hub engagement means comprising one of a axially oriented blind hole and an axially oriented outwardly extending shaft, the outwardly extending shaft having a smaller diameter than the elongate rods; and
    an elongate flexible member providing opposing ends thereof, each one of the opposing ends of the flexible member joined to a second end of one of the elongate rods;
    the flexible member being of such length as to permit the elongate rods to be positioned in parallel spaced apart positions for being engaged with spaced apart wheel mounting elements of the wheel hub.

2. The apparatus of claim 1 wherein the flexible member is a coil spring.

3. The apparatus of claim 2 wherein each of the second ends of the elongate rods provides a threaded hole for threadably receiving one of the ends of the coil spring.

4. The apparatus of claim 2 wherein each of the second ends of the elongate rods provides a threaded hole, a threaded stud being threadably engaged therein, a portion of the threaded stud extending outwardly from the threaded hole with the coil spring threadably engaged thereon.

5. The apparatus of claim 2 wherein each of the second ends of the elongate rods provides a threaded stud extending outwardly therefrom, the threaded stud receiving the coil spring threadably thereon.

6. The apparatus of claim 1 wherein the flexible member is an elastic cord.

7. The apparatus of claim 6 wherein each of the second ends of the elongate rods provides a threaded hole receiving one of an opposing ends of the elastic cord, a pair of threaded caps engaging the threaded holes for securing the ends of the elastic cord therein.

8. The apparatus of claim 6 wherein each of the second ends of the elongate rods provides a handle engaged therewith, each of the handles adapted for engaging one of the ends of the elastic cord.

9. The apparatus of claim 1 wherein the linear rods each have a hard smooth surface of such coefficient of friction as to enable the automobile wheel to slide along the linear rods, by manual pressure when the linear rods are held approximately horizontally.

* * * * *